US011396980B2

United States Patent
Neils et al.

(10) Patent No.: US 11,396,980 B2
(45) Date of Patent: Jul. 26, 2022

(54) LOW VIBRATION CRYOCOOLED CRYOSTAT

(71) Applicant: QUANTUM DESIGN INTERNATIONAL, INC., San Diego, CA (US)

(72) Inventors: William Neils, San Diego, CA (US); Dinesh Martien, San Diego, CA (US); Randall Black, San Diego, CA (US)

(73) Assignee: QUANTUM DESIGN INTERNATIONAL, INC., San Diego, CA (US)

( * ) Notice: Subject to any disclaimer, the term of this patent is extended or adjusted under 35 U.S.C. 154(b) by 624 days.

(21) Appl. No.: 16/189,926

(22) Filed: Nov. 13, 2018

(65) Prior Publication Data
US 2020/0149686 A1  May 14, 2020

(51) Int. Cl.
| F25D 19/00 | (2006.01) |
| F17C 13/08 | (2006.01) |
| F16F 15/04 | (2006.01) |
| F17C 3/08  | (2006.01) |
| F25B 25/00 | (2006.01) |

(52) U.S. Cl.
CPC ............ *F17C 13/086* (2013.01); *F16F 15/04* (2013.01); *F17C 3/085* (2013.01); *F25B 25/005* (2013.01); *F25D 19/006* (2013.01); *F17C 2203/014* (2013.01); *F17C 2221/017* (2013.01); *F17C 2270/0527* (2013.01); *F25B 2500/13* (2013.01)

(58) Field of Classification Search
CPC ...... F17C 13/086; F17C 3/085; F25D 19/006; F16F 1/041; F16F 7/08
USPC ............................................ 62/51.1, 6, 47.1
See application file for complete search history.

(56) References Cited

U.S. PATENT DOCUMENTS

| 4,827,736 | A  | * | 5/1989  | Miura ....................... F25B 9/10 62/51.1 |
| 5,129,232 | A  | * | 7/1992  | Minas ...................... F16F 15/04 248/636 |
| 5,163,297 | A  | * | 11/1992 | Yani ....................... F17C 13/006 250/352 |
| 8,291,717 | B2 | * | 10/2012 | Radovinsky .......... F25D 19/006 62/50.7 |
| 8,746,008 | B1 |   | 6/2014  | Mauritsen et al. |
| 8,756,941 | B2 |   | 6/2014  | Snow et al. |
| 9,234,691 | B2 |   | 1/2016  | Black et al. |
| 9,709,313 | B2 | * | 7/2017  | Miki ........................ F25D 3/10 |
| 9,982,840 | B2 | * | 5/2018  | Wikus ................ G01R 33/3804 |

(Continued)

*Primary Examiner* — Brian M King
(74) *Attorney, Agent, or Firm* — Stetina Brunda Garred & Brucker

(57) ABSTRACT

A low vibration cryostat includes a cryocooler with a cold head having a flange and a cooling body extending from the flange. A housing is coupled to the cold head, with the housing having an opening receiving at least a portion of the cooling body. A first bellows extends between the housing and the flange to mitigate the transfer of vibrational forces between the housing and the flange. The first bellows, the flange, and the housing collectively define a first chamber. A force balancing assembly containing a second bellows is coupled to the housing and includes a second chamber spaced from the first chamber. The two chambers are arranged to create a net zero force on the cold head when the pressure in the bellows changes. A viscous damping assembly mitigates bouncing of the cold head on support springs.

18 Claims, 5 Drawing Sheets

(56) References Cited

U.S. PATENT DOCUMENTS

| | | | | |
|---|---|---|---|---|
| 2003/0106326 A1* | 6/2003 | Sekimoto | ............... | F17C 3/085 62/51.1 |
| 2005/0028537 A1* | 2/2005 | Yuan | ................... | F25D 19/006 62/51.1 |
| 2005/0229620 A1* | 10/2005 | Kirichek | ............... | F25D 19/00 62/295 |
| 2012/0031110 A1* | 2/2012 | Tanaka | ................ | F25D 19/006 62/51.1 |
| 2015/0252799 A1* | 9/2015 | Roscher | ............... | F25D 19/006 62/6 |
| 2017/0261413 A1* | 9/2017 | Schreibeis | ............... | G01N 1/42 |
| 2017/0314843 A1* | 11/2017 | Dal Savio | ............. | A47B 13/08 |
| 2017/0356520 A1* | 12/2017 | Bauer | .................... | F16F 9/063 |
| 2018/0143273 A1 | 5/2018 | Martien et al. | | |

\* cited by examiner

LOW VIBRATION CRYOCOOLED CRYOSTAT

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a cryostat, and more specifically to a low vibration cryostat which minimizes mechanical and acoustic coupling, while preserving thermal coupling.

2. Description of the Related Art

Low temperature cryostats, combined with superconducting magnets and measurement instrumentation, have become common place in materials research labs and other settings where one requires low temperatures or high magnetic fields to perform experiments, prepare materials, or evaluate fundamental properties of matter. Traditionally, low temperature cryostats may be cooled by the addition of liquid helium which is periodically transferred into the cryostat on a regular basis, such as once or twice a week. The liquid helium may eventually evaporate and may either be lost to the atmosphere or captured by a recovery system for reliquefication.

Cryostats wherein liquid helium may be regularly added thereto may be associated with many benefits including a rather simple cryostat design, potentially very low vibrations, and very large cooling powers. However, there may be significant drawbacks to using these types of cryostats. For example, the process of cooling a liquid cryostat down from room temperature generally requires a trained technician several hours. Also, for those laboratories that do not have liquefaction facilities on site, obtaining liquid helium can be expensive, difficult, or even impossible depending on regional availability.

More recently, compact closed cycle GM-type cryocoolers have been developed that are capable of providing continuous cooling to low temperatures, such as 4 K. As a result, many of the earlier cryostats were converted or redesigned to obtain their cooling from cryocoolers rather than from a boiling bath of liquid helium. Many such cryocooled systems feature fully automatic cooldown and warm-up operations that eliminate the need for a trained technician. They may also be operated unattended for weeks or months. Furthermore, these systems may require only electrical power, and sometimes cooling water and a small quantity of bottled helium gas to operate. These requirements may not involve a complex liquid helium supply chain and so are easily met by almost any lab around the world.

Although cryocooled cryostats provide several advantages over their conventional predecessors, one critical drawback associated with the use of cryocoolers for laboratory cryostats is that they vibrate. The extent to which a GM-type cryocooler vibrates may depend on the capacity of the cooler and the details of its construction and operation. For a given cooling capacity, the lowest vibration coolers of the GM-type may include the GM-type pulse tube coolers. The vibrations in these coolers are normally lower than other types because the cold head itself has no moving parts and may be connected to a remote valve through one or more flexible hoses, through which the periodic gas pulses are delivered.

However, vibrations from the periodic (e.g., 1 to 2 Hz) flow of high-pressure helium into and out of the cold head may still be present. These gas pulses may cause physical deformations of the flexible connecting hose and even the cooler itself at the frequency of the gas pulses. The turbulence from the flowing gas creates mechanical vibrations at higher frequencies in all surfaces of the cold head body. The vibrations may be of a magnitude that create displacements that are unacceptable for many vibration-sensitive applications of cryostats. For instance, the vibrations and deformations of pulse-tube coolers may have amplitudes measured in micrometers, but some of the most vibration-sensitive applications for cryostats require displacements of nanometers or less.

Accordingly, there is a need in the art for a low vibration cryostat. Various aspects of the present disclosure address this particular need, as will be discussed in more detail below.

BRIEF SUMMARY

In accordance with one embodiment of the present disclosure, there is provided a low vibration cryostat comprising a cryocooler with a cold head having a flange and a cooling body extending from the flange. A housing is coupled to the cold head, with the housing having an opening which receives at least a portion of the cooling body of the cold head. A first bellows extends between the housing and the flange of the cold head to mitigate the transfer of vibrational forces between the housing and the flange of the cold head. The first bellows applies a first force to the cold head. The first bellows, the flange, and the housing collectively define a first chamber. A force balancing assembly is spaced from the first chamber and is arranged to apply an opposition force to the cold head which acts to oppose the first force applied to the cold head by the first bellows.

The force balancing assembly may include a pair of opposing supports, and a second bellows extending between the pair of opposing supports to mitigate the transfer of vibrational forces between the pair of opposing supports. The second bellows may be of similar construction to the first bellows. The second bellows and the pair of opposing supports may define a second chamber. A pressure equalizing conduit may fluidly connect the first and second chambers to facilitate pressure equalization between the first and second chambers so as to provide the opposition force. The pair of opposing supports may include a first plate and a second plate opposite the first plate. One or more connecting rods or rigid mechanical links may extend between the first plate and the cold head. The cold head and the first plate may collectively define a rigid head assembly. At least one support strut may be used to form a rigid mechanical link extending between the housing and second plate to couple the second plate to the housing. Spring supports may extend between the first plate and the housing for isolating the housing from vibrations of the cold head and supporting a weight of the head assembly. Adjustable supports may be coupled to the housing and the springs, with the adjustable supports including an adjustable end portion moveable relative to the housing for adjusting the height of the cold head.

The low vibration cryostat may include a support frame coupled to the cold head, with the frame having an upper frame member and a lower frame member spaced from the upper frame member. A remote valve may be coupled to the support frame, and at least one flexible hose may connect the remote valve to the cold head.

A damping assembly may extend between a portion of the support frame and the cold head to mitigate the bouncing of the cold head on the spring supports. The damping assembly may include at least one viscous damper.

According to another embodiment, a low vibration cryostat includes a frame, a cryocooler with a cold head, and a housing having an opening, with at least a portion of the cryocooler extending through the opening and into the housing. At least one spring may support the weight of the cold head. A trio of upper mounts may be coupled to the frame, and a trio of lower mounts may be coupled to the cold head. The low vibration cryostat may include six linear dampers, with each damper having a first end portion coupled to one of the trio of upper mounts, and a second end portion coupled to one of the trio of lower mounts, such that each upper mount includes two first end portions coupled thereto, and each lower mount includes two second end portions coupled thereto. The six linear dampers provide both rotational and translational damping of the cryocooler relative to the frame to prevent bouncing of the cold head on the springs and the corresponding periodic force on the housing.

Each linear damper may include a pair of plates moveable relative to each other to facilitate transition of the corresponding linear damper between an extended position and a retracted position. Each linear damper may transition from the extended position toward the retracted position as a result of the first end portion of the linear damper moving away from the second end portion. Each linear damper may transition from the retracted position toward the extended position as a result of the first end portion of the linear damper moving toward the second end portion. A damping grease may be positioned between the pair of plates. Each of the pair of plates may be coupled to a sleeve sized and structured to receive the other one of the pair of plates.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
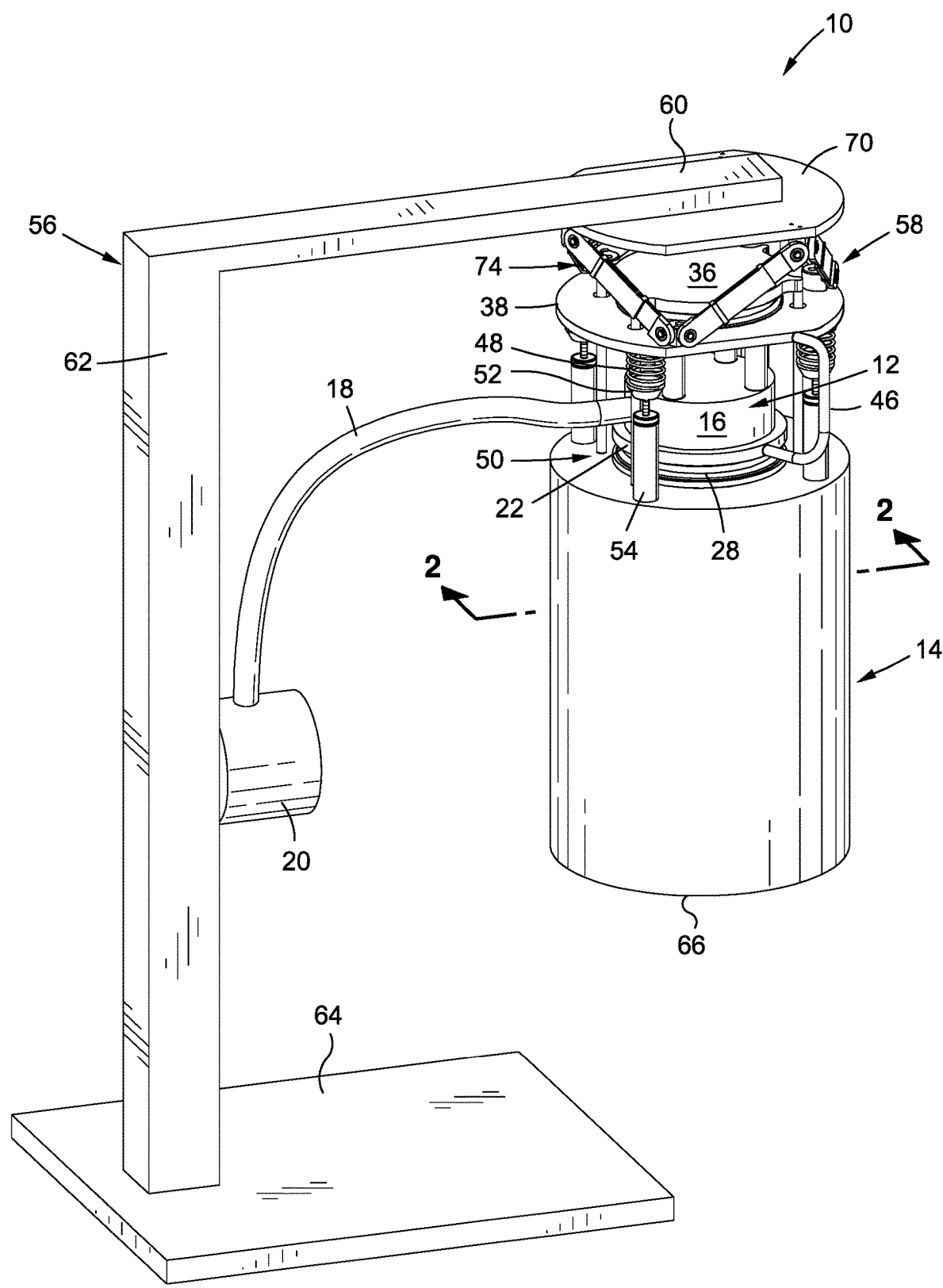
FIG. 1 is an upper perspective view of a low vibration cryostat.

Referring now to the drawings, wherein the showings are for purposes of illustrating a preferred embodiment of the present disclosure, and are not for purposes of limiting the same, there is depicted a low vibration cryostat 10 including a cryocooler 12 and a housing 14 which receives a portion of the cryocooler 12. The low vibration cryostat 10 is configured to minimize mechanical and acoustic coupling between the cold head 16 and the housing 14. More specifically, the vibration mitigation features described herein may decouple mechanical vibrations between the cold head 16 and the housing 14, while maintaining useful thermal communication to the cold stages of the cold head 16. In this regard, the low vibration cryostat 10 may minimize vibrations to nanometers or less to allow for use of the cryostat 10 to conduct vibration sensitive experiments and other uses.

Figure 5:
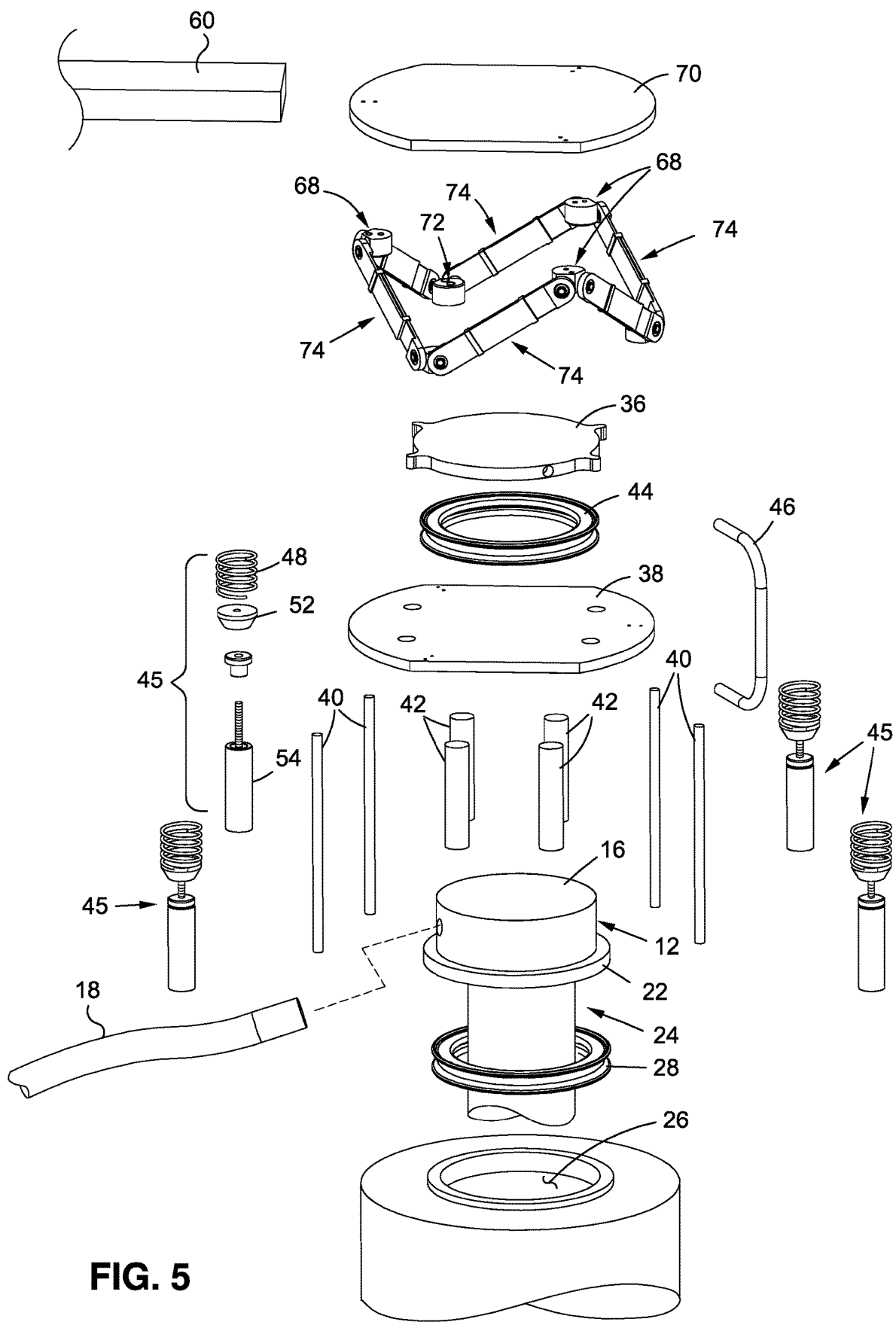
FIG. 5 is an exploded view of the low-vibration cryostat.

The cryocooler 12 may include a GM-type pulse tube cryocooler having a cold head 16 coupled to a flexible hose 18 that connects to a remote valve 20. The flexible hose 18 may facilitate the flow of high-pressure helium into and out of the cold head 16, and may include one or more hoses, including a large hose and a significantly smaller hose having an insignificant impact on vibration. The cold head 16 itself may include a flange 22 (e.g., an ambient temperature flange), which is coupled to a cooling body 24 (see FIG. 2) extending from the flange 22. The cooling body 24 may include multiple cooling stages 25, 27, and may extend from the flange 22, with a distal (e.g., lower) portion thereof being received in the housing 14, which includes an opening 26 (see FIG. 5) sized to receive the cooling body 24. The housing 14 may sit on an optical bench 29, which in turn, may be supported on the floor using pneumatic isolators 31.

A first bellows 28 may extend between the housing 14 and the flange 22 of the cold head 16 to mitigate the transfer of vibrational forces between the housing 14 and the flange 22 of the cold head 16. The first bellows 28, the flange 22, and the housing 14 may collectively define a lower chamber (e.g., a first chamber) 30. The interconnection between the flange 22, first bellows 28 and the housing 14 may create a hermetic seal between the ambient environment and the lower chamber 30.

The cryostat 10 may be an optical cryostat, with helium exchange gas below the flange 22 in an interior volume of the housing 14. Such a cryostat 10 may experience variable heat loads from the circulating helium that is used for temperature control of an experiment region and for the cooling of an integrated superconducting magnet. The optical cryostat may be designed to facilitate optical experiments where the cryocooler 12 provides cooling to a region of the cryostat 10 that has one or more optical windows between the experiment space and a region outside the cryostat 10 at ambient temperature and pressure. An example of an optical cryostat can be seen in U.S. Patent Application Publication No. US 2018/0143273, entitled Conical Access Split Magnet System, owned by Quantum Design International, Inc., the assignee of the present disclosure, the contents of the aforementioned publication being expressly incorporated herein by reference. A complete experiment may include the cryostat 10 as one component in a configuration including hundreds of filters, mirrors, light sources and detectors precisely arranged and attached rigidly to an optical bench 29. The optical bench 29 may be designed to be extremely rigid and mechanically isolated from the surroundings through pneumatic supports so as to minimize the relative displacement of components mounted to the optical bench 29.

Operation of the cryostat 10 may produce a pressure gradient between the ambient environment outside the cryostat 10 and the lower chamber 30, wherein variable pressure helium exchange gas may be located below the flange 22. The pressure gradient may create a large and variable force, leading to an undesirable transfer of vibrations from the cold head to the cryostat 10. This force may be greater than 100 kg and may vary with time as in the case with a helium exchange gas. Accordingly, one aspect of the present disclosure is directed toward minimizing the effects of the pressure gradient and the vibrational forces associated therewith.

According to one embodiment, the cryostat 10 may include a force balancing assembly 32 (see FIG. 2) for minimizing the effects of the pressure gradient. The force balancing assembly 32 may include an upper chamber (e.g., a second chamber) 34 opposite to, and spaced from, the lower chamber 30 relative to the flange 22 of the cold head 16 to create a force balance on opposite sides of the flange 22, as will be explained in more detail below.

The force balancing assembly 32 may include a pair of opposing supports, including a top plate 36 and a bottom plate 38 spaced from the top plate 36. The top plate 36 may be coupled to the housing 14 via one or more support struts 40, while the bottom plate 38 may be secured to the cold head 16 via one or more connecting rods 42 (e.g., rigid mechanical link) thus forming a rigid head assembly. A second bellows 44 may extend between the top plate 36 and the bottom plate 38 to mitigate the transfer of vibrational forces therebetween. The second bellows 44, the top plate 36, and the bottom plate 38 may collectively define the upper chamber 34, which may be hermetically sealed from the ambient environment. The cross-sectional area of the second bellows 44 may be identical to the cross-sectional area of the bellows 28 at the cold head flange 22. The similar configuration of the first and second bellows 28, 44 may aid in creating substantially equal, balancing forces on the cold head flange 22, as will be described in more detail below.

Figure 2:
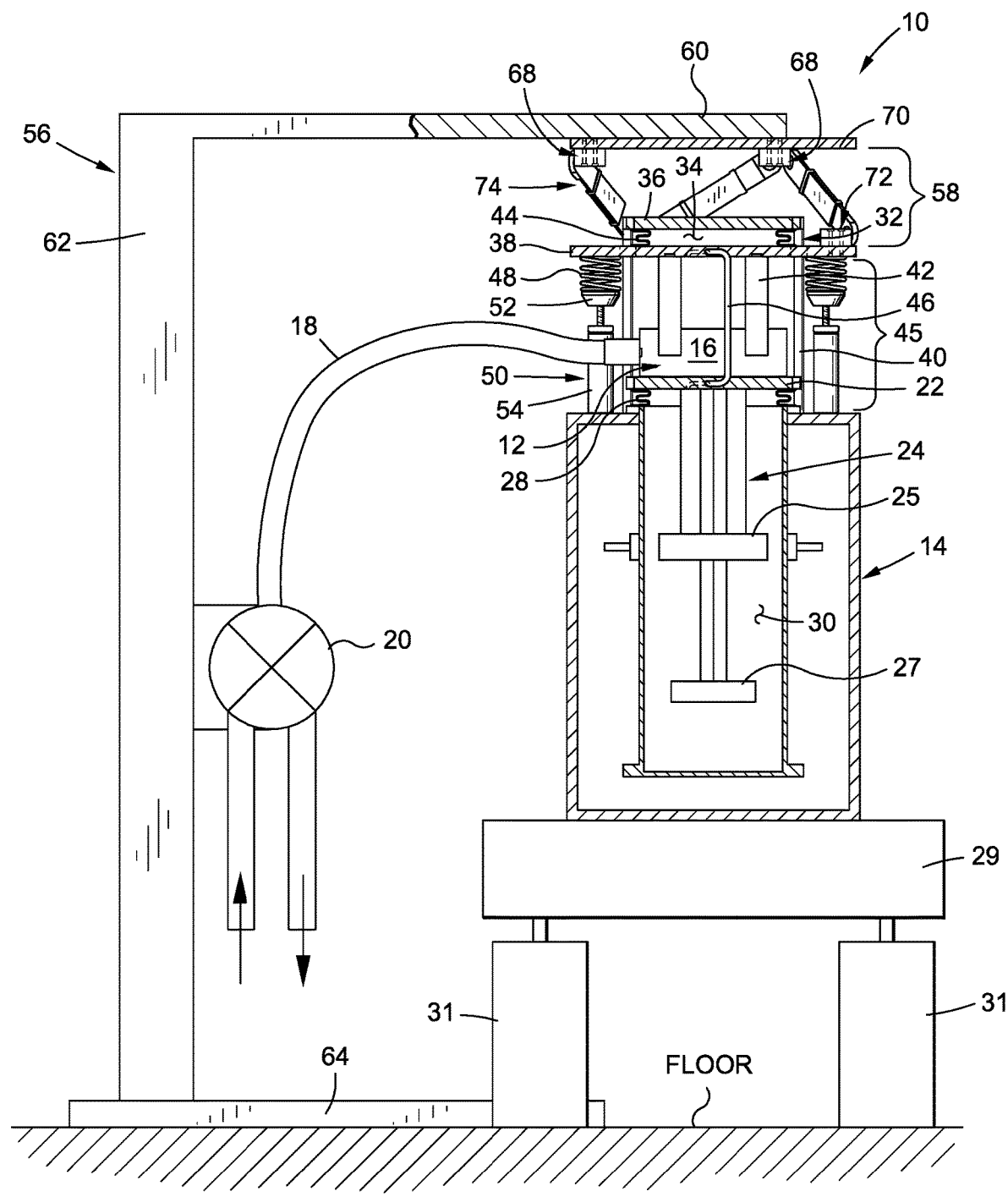
FIG. 2 is a cross sectional view of the low vibration cryostat coupled to an optical bench.

A pressure equalizing conduit 46 may extend between the upper and lower chambers 34, 30 to place the upper and lower chambers 34, 30 in fluid communication with each other for purposes of facilitating pressure equalization therebetween. As shown in FIG. 2, the pressure equalization conduit 46 may extend from the bottom plate 38 of the force balancing assembly 32 to the flange 22 of the cold head 16. The bottom plate 38 may include an internal passageway which places the pressure equalizing conduit 46 in communication with the upper chamber 34, while the flange 22 may include an internal passageway which places the pressure equalizing conduit 46 in communication with the lower chamber 30.

When the pressure in the lower chamber 30 increases, gas may move into the upper chamber 34 via the pressure equalizing conduit 46 to increase the pressure in the upper chamber 34 until the pressure in the upper chamber 34 equalizes with the pressure in the lower chamber 30. The pressure in the upper chamber 34 causes the upper bellows 44 to press downwardly on the cold head 16, while the pressure in the lower chamber 30 causes the lower bellows 28 to press upwardly on the cold head 16. Since the pressure in the upper chamber 34 and lower chamber 30 are substantially equal, and since the configuration of the upper and lower bellows 44, 28 are substantially similar, the downward force of the upper bellows 44 on the cold head 16 is substantially equal to the upward force of the lower bellows 28 on the cold head 16. As a result, there is little or no net static force due to pressure changes between the interior and exterior of the cryostat 10.

The above-described configuration of two opposing pressurized chambers, each being associated with a respective bellows which impart counteracting forces on the cold head 16 may be particularly suited for relatively slow pressure changes because of the delayed pressure equalization which may be caused by the flow impedance in the conduit 46 that connects the lower chamber 30 with the upper chamber 34.

Without variable net forces acting on the cold head 16, it is possible to support the weight (10-20 kg) of the cold head 16 using very soft springs or other low-pass isolation mechanisms without experiencing displacement due to pressure changes. A low-pass isolation mechanism may block most vibrations, so it can be placed directly between the cold head 16 and the housing 14. Accordingly, one or more spring isolators 45 may be positioned between the lower plate 38 and the housing 14 for greatly reducing transfer of vibrational forces between the lower plate 38 and the housing 14. In one embodiment, each isolator 45 includes a spring 48 and an adjustable support 50, with the spring 48 being coupled to a bottom surface of the lower plate 38 and extending to the adjustable support 50. The adjustable support 50 may include an adjustable end portion 52 and a base 54, wherein the base 54 is mounted on the housing 14, and the adjustable end portion 52 is connected to a respective spring 48 on one end and threaded to the base 54 on another end. The adjustable end portion 52 may be rotated relative to the base 54 and the housing 14 to allow for axial adjustment of the adjustable end portion 52 relative to the base 54 and housing 14. The adjustment of the springs 48 may be used to alter height and tilt to position the cold head 16 within the few mm of bellows-travel where there is no hard contact between the cold head 16 and the housing 14. This adjustment may only be required once since it is dependent only on the weight of the cold head 16 and the spring rate of the isolators 45.

With the cold head 16 supported in this way, the only significant vibration coupling to the cryostat 10 may be through the low-pass isolators 45 and the soft material of the bellows 28, 44. Typically, vibrations in the cold head 16 measure a few micrometers at frequencies above a few Hz and so this weak coupling to the housing 14 may result in displacements of only a few nanometers in the housing 14. However, at the pulse frequency of the cryocooler 12 (e.g., 1-2 Hz), the displacement of the cold head 16 may be significantly larger. The reason is that the gas pulses in the flexible hose 18 that connects the remote valve 20 to the cold head 16 may cause it to expand and contract periodically. This may cause the cold head 16 to bounce up and down on the spring isolators by 10s or 100s of micrometers resulting in displacements in the housing 14 of 10s or 100s of nanometers at this frequency. Furthermore, the periodic force from this bouncing may stimulate the natural resonance of the mass-spring system formed by the optical bench 29 and the pneumatic isolators 31 on which it rests. This can result in the entire optical bench 29 bouncing and deforming at this frequency along with the cryostat 10.

To stop the bouncing, the cold head 16 may be stabilized. Since the periodic forces that cause the bouncing may be primarily caused by the expansion and contraction of the flexible hose 18 connecting the remote valve 20 to the cold head 16, the bracing may only be required to prevent the relative motion between the valve 20 and the cold head 16. In other words, there may be no strict need to rigidly anchor the cold head 16 to an external stationary reference like the floor to prevent its motion. When the hose 18 contracts or expands, the force on the cold head 16 may be bypassed through the rigid bracing and so there is very little displacement of the cold head 16. Furthermore, this bracing only needs to be rigid on time scales comparable to or shorter than the pulse frequency.

To realize this bracing system, the remote valve 20 may be attached to a rigid frame 56 that is coupled to the cold head 16 through a viscous damper assembly 58. The frame 56 may include an upper frame member 60, an intermediate frame member 62 coupled to the upper frame member 60, and a lower frame member 64 coupled to the intermediate frame member 62 opposite the upper frame member 60. The lower frame member 64 may rest on the floor along with the pneumatic isolators 31 supporting the optical bench 29.

The viscous damping assembly 58 may extend between the upper frame member 60 and the lower plate 38 of the force balancing assembly 32 to mitigate bouncing of the cold head 16. The viscous damping assembly 58 may include a trio of upper mounts 68 coupled to the frame 56 via an upper mounting plate 70, while a trio of lower mounts 72 may be coupled to the bottom plate 38, which is coupled to the cold head 16 via the connecting rod 42. Each upper mount 68 may be radially spaced from the remaining upper mounts 68 by approximately 120 degrees, and similarly, each lower mount 72 may be radially spaced from the remaining lower mounts 72 by approximately 120 degrees.

Figure 3:
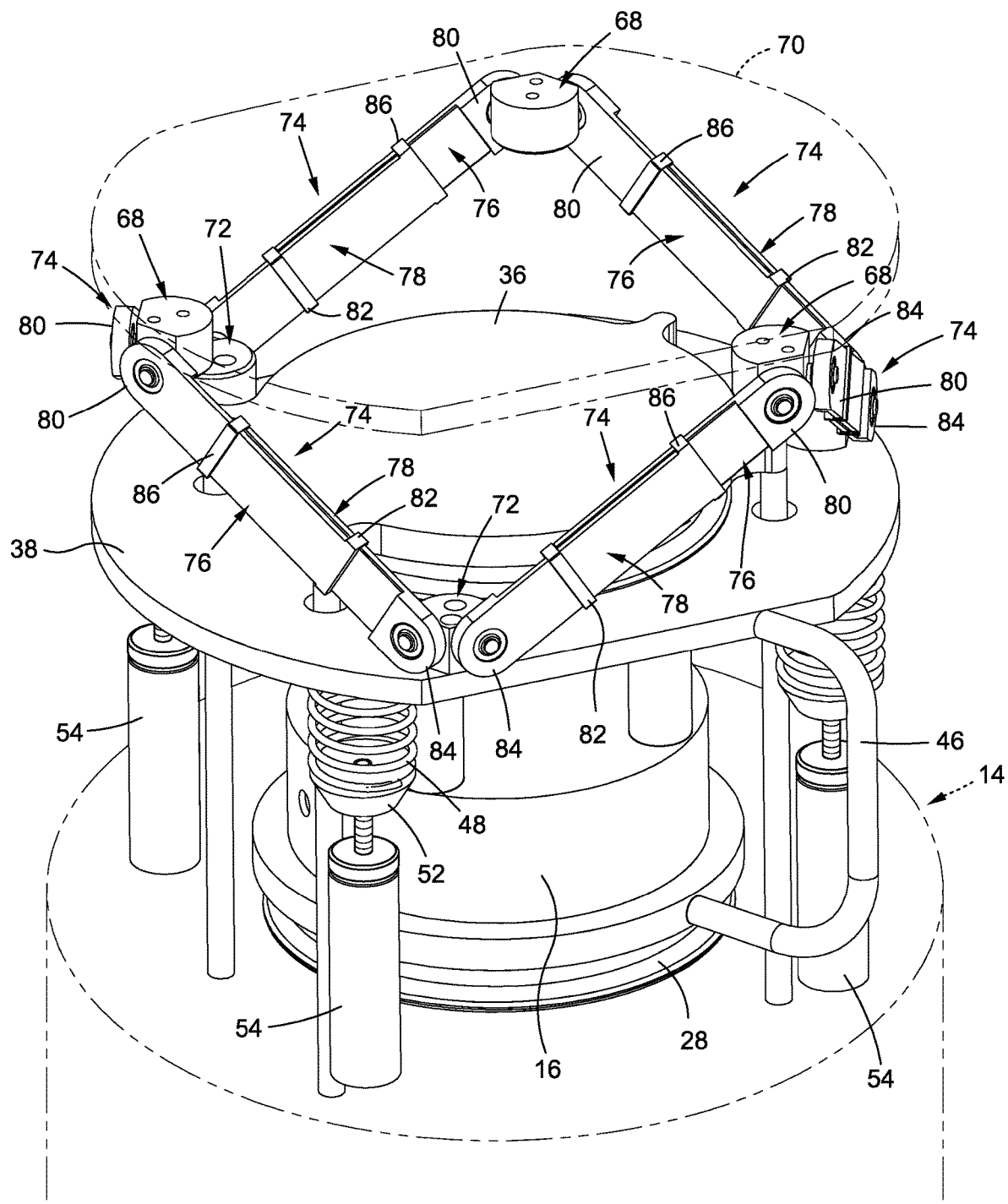
FIG. 3 is an upper perspective view of an upper subassembly of the low vibration cryostat.
Figure 4:
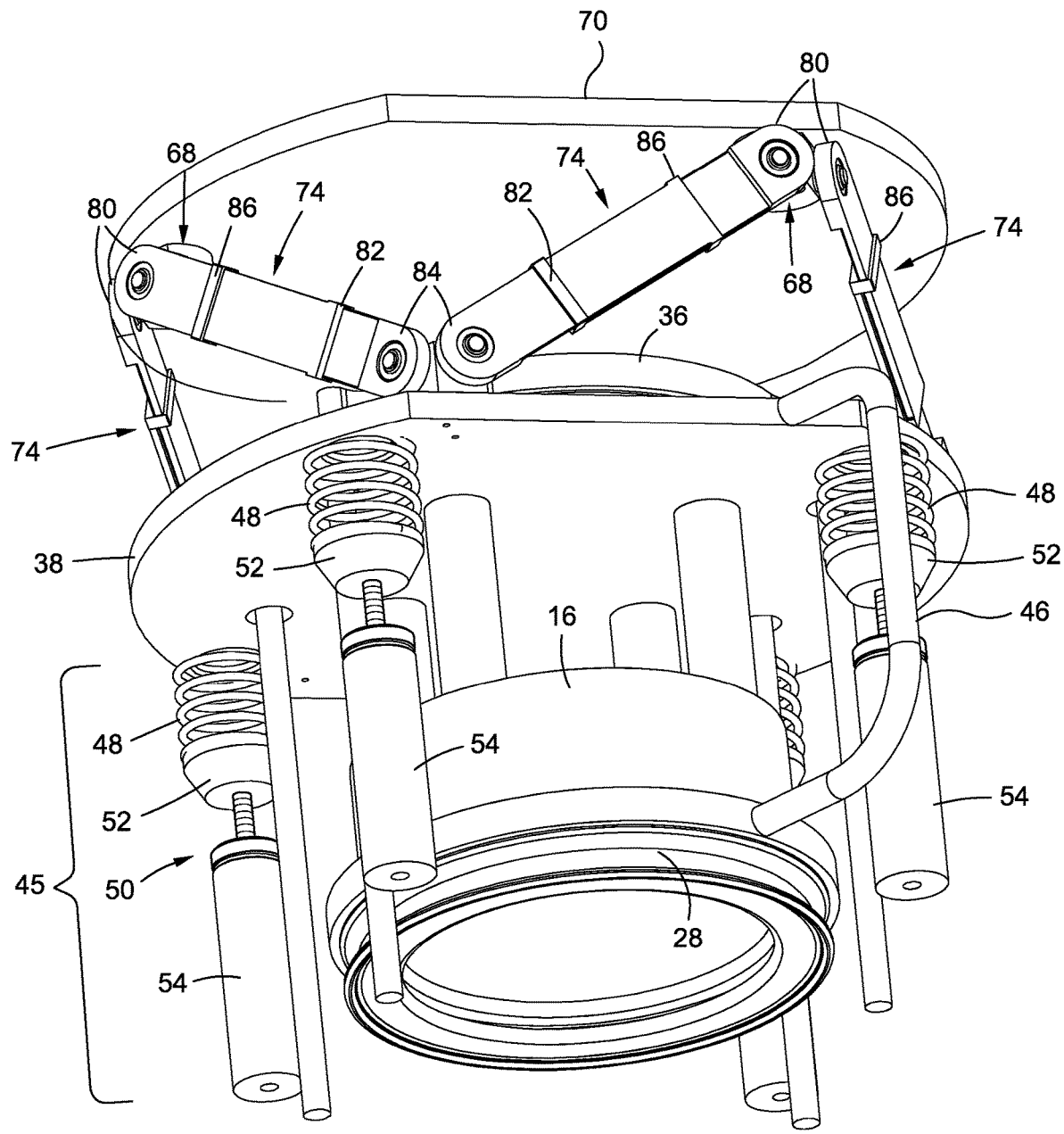
FIG. 4 is a lower perspective view of the upper subassembly of the low-vibration cryostat.

The viscous damping assembly 58 may additionally include six linear dampers 74, which allow for movement of the cold head 16 relative to the frame 56 while providing both rotational and translational damping to prevent both linear and rotational bouncing of the cold head 16. According to one embodiment, each damper 74 is a viscous linear damper comprised of a pair of plates, namely a first plate 76 (see FIGS. 3 and 4) and a second plate 78 moveable relative to each other between an extended position and a retracted position. The two plates 76, 78 may be configured such that the plates 76, 78 shear past each other when the damper 74 is extended or contracted.

The first plate 76 defines a first end portion 80 of the damper 74, which is pivotally coupled to one of the upper mounts 68. The first plate 76 may be connected to a first sleeve 82 defining an opening sized to receive the second plate 78. The second plate 78 defines a second end portion 84 of the damper 74, which is pivotally coupled to one of the lower mounts 72. The second plate 78 may be connected to a second sleeve 86 defining an opening sized to receive the first plate 76. As a given damper 74 transitions between the extended and retracted positions, the distance between the first and second sleeves 82, 86 may vary. In particular, as the damper 74 transitions from the extended position to the retracted position, the distance between the first and second sleeves 82, 86 may increase, which results in a shortening of the damper length, and conversely, as the damper 74 transitions from the retracted position toward the extended position, the distance between the first and second sleeves 82, 86 may decrease, which results in a lengthening of the damper length. The damper length may be defined as the distance between the attachment points to the upper and lower mounts 68, 72.

A damping grease of suitably high viscosity may be positioned between the first and second plates 82, 84 to achieve a desired damping effect or friction between the first and second plates 82, 84. The result may be a near ideal linear viscous damper with the property that it is nearly rigid when sudden force impulses occur, but slides at a constant rate when a constant force is applied. This purely viscous behavior and lack of springiness may differ from more common linear dampers designed to absorb shocks and that use gas, elastomers, or springs.

The viscous damping assembly 58 may be arranged such that each upper mount 68 includes the first end portions 80 of two dampers 74 coupled thereto, and each lower mount 72 includes the second end portions 84 of two dampers 74 coupled thereto. In other words, each linear damper 74 may extend between an upper mount 68 and a lower mount 72, with each upper and lower mount 68, 72 accommodating two dampers 74.

The viscous damper assembly 58 may have the property that it is substantially rigid at frequencies near and above the pulse frequency of the cryocooler 12, yet it supports no static force that would cause a compression or extension of the springs 48 supporting the cold head 16 on the housing 14. This may have the benefit that the relative positions of the cold head 16 and the valve 20 can be changed by several centimeters without affecting the millimeter-precision alignment between the cold head 16 and the housing 14 that is set by the adjustable support 50. This may allow the user of the cryostat 10 to easily adjust the location of the cryostat 10 as needed to better accommodate their experimental setup without damaging the cryostat 10 or compromising the vibration isolation. A common case in which it is important to accommodate a change in location of the cryostat 10 is when pneumatic isolator springs are used to float the optical bench on which the cryostat 10 would normally sit. The height of a floated bench can change by a centimeter or more in response to heavy objects being added or removed from the bench, or by compressed air being added or removed from the isolators.

The viscous damping assembly 58 may constrain all six degrees of freedom of the cold head 16 relative to the remote valve 20. This may be required because the expansion and contraction of the flexible hose 18 may result in both a vector force and torque on the cold head 16. To damp all six degrees of freedom, the six viscous linear dampers 74 may be mounted in an arrangement akin to a Stewart platform. A Stewart platform may refer to a platform that uses six independent linear actuators attached to two rigid stages using zero-backlash ball joints and arranged and coordinated to achieve three independent linear and three independent rotational degrees of controlled relative motion between these stages. The viscous damping assembly 58 may include purely viscous linear dampers 74 to provide relative damping between two rigid plates, e.g., stages, 38, 70. If the linear dampers 74 are constructed as simple viscous dampers without return springs, static friction, or free-motion, then damping in all six degrees of freedom between the two rigid stages occurs without static force or torque.

While a viscous damping assembly based on a Stewart platform geometry is the preferred embodiment of this disclosure, it is understood that there are many other ways to achieve damping in six degrees of freedom. For instance, a combination of passive elements like viscous ball-joints, shear plates, pistons, and sliders, could be constructed by one skilled in the art to derive a suitable viscous damping assembly that provides purely viscous damping in six degrees of freedom. Furthermore, it is understood that damping in fewer than six degrees of freedom may be adequate to eliminate bouncing of the cold head 16 in special cases if the dampers are arranged to target the bouncing modes of a specific cold head 16 and spring system. Such an arrangement would require readjustment if the relative positions of the house 14, remote valve 20, cold head 16, or other components are changed and so would represent a practical, but less desirable embodiment.

With the viscous damping assembly 58 combined with the other elements described above, the result may be a practical low vibration cryocooled cryostat 10 with excellent mechanical decoupling between the cold head 16 and housing 14, with little or no motion of the cold head 16, while allowing static displacements of the housing 14 without the need to realign the cold head 16 with the housing 14.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A low vibration cryostat comprising:
a cryocooler with a cold head having a flange and a cooling body extending from the flange;
a housing coupled to the cold head, the housing having an opening which receives at least a portion of the cooling body of the cryocooler;
a first bellows extending between the housing and the flange of the cold head to mitigate the transfer of vibrational forces between the housing and the flange of the cold head, the first bellows applying a first force to the cold head, the first bellows, the flange, and the housing collectively defining a first chamber; and
a force balancing assembly spaced from the first chamber and arranged to apply an opposition force to the cold head which acts to oppose the first force applied to the cold head by the first bellows, the force balancing assembly including:
a pair of opposing supports;
a second bellows extending between the pair of opposing supports to mitigate the transfer of vibrational forces between the pair of opposing supports, the second bellows and the pair of opposing supports defining a second chamber; and
a pressure equalizing conduit fluidly connecting the first and second chambers to facilitate pressure equalization between the first and second chambers so as to provide the opposition force.

2. The low vibration cryostat recited in claim 1, wherein the pair of opposing supports includes a first plate and a second plate opposite the first plate, the low vibration cryostat further comprising a first rigid mechanical link between the first plate and the cold head, the cold head and first plate collectively defining a rigid head assembly.

3. The low vibration cryostat recited in claim 2, further comprising a second rigid mechanical link between the housing and second plate.

4. The low vibration cryostat recited in claim 2, further comprising one or more springs extending between the rigid head assembly and the housing for isolating the housing from vibrations of the cold head and supporting a weight of the rigid head assembly.

5. The low vibration cryostat recited in claim 4, further comprising an adjustable support coupled to the housing and the spring, the adjustable support including an adjustable end portion moveable relative to the housing for adjusting a distance between the head assembly and the housing.

6. The low vibration cryostat recited in claim 4, where the cryocooler is a pulse-tube type cryocooler comprising:
a support frame;
a remote valve coupled to the support frame; and
at least one flexible hose connecting the remote valve to the cold head.

7. The low vibration cryostat recited in claim 6 further comprising a damping assembly extending between the rigid head assembly and a portion of the support frame to prevent bouncing of the rigid head assembly relative to the support frame.

8. The low vibration cryostat recited in claim 7, wherein the damping assembly includes at least one viscous damper.

9. A low vibration cryostat, comprising:
a cryocooler with a cold head having a flange and a cooling body extending from the flange;
a housing coupled to the cold head, the housing having an opening which receives at least a portion of the cooling body of the cryocooler;
a first bellows extending between the housing and the flange of the cold head to mitigate the transfer of vibrational forces between the housing and the flange of the cold head, the first bellows applying a first force to the cold head, the first bellows, the flange, and the housing collectively defining a first chamber;
a force balancing assembly spaced from the first chamber and arranged to apply an opposition force to the cold head which acts to oppose the first force applied to the cold head by the first bellows;
a frame;
one or more springs operatively coupled to the cryocooler and housing;
at least one upper mount coupled to the frame;
at least one lower mount coupled to the cold head; and
at least one linear damper having an end portion coupled to the at least one upper mount, and a second end portion coupled to the at least one lower mount to prevent bouncing of the cold head relative to the frame.

10. The low vibration cryostat recited in claim 9, wherein:
the at least one upper mount includes a trio of upper mounts;
the at least one lower mount includes a trio of lower mounts; and
the at least one linear damper includes six linear dampers, each linear damper having a first end portion coupled to one of the trio of upper mounts, and a second end portion coupled to one of the trio of lower mounts, such that each upper mount includes two first end portions coupled thereto, and each lower mount includes two second end portions coupled thereto, the six linear dampers providing both rotational and translational damping of the cryocooler relative to the frame to prevent bouncing of the cold head relative to the frame.

11. The low vibration cryostat recited in claim 9, wherein the at least one linear damper includes a pair of plates arranged to shear relative to each other when the at least one linear damper is extended as a result of the first end portion moving away from the second end portion or retracted as a result of the first end portion moving toward the second end portion.

12. The low vibration cryostat recited in claim 11, further comprising a damping grease positioned between the pair of plates.

13. The low vibration cryostat recited in claim 9, further comprising a first bellows extending between the housing and the cold head to mitigate the transfer of vibrational forces between the housing and the cold head.

14. The low vibration cryostat recited in claim 13, further comprising:
a first chamber at least partially defined by the housing;
a second chamber spaced from the first chamber; and a pressure equalizing conduit extending between the first and second chambers to facilitate pressure equalization between the first and second chambers.

15. The low vibration cryostat recited in claim 14, further comprising:
a pair of opposing plates at least partially defining the second chamber; and
a second bellows extending between the pair of opposing plates for mitigating the transfer of vibrational forces between the pair of opposing plates.

16. The low vibration cryostat recited in claim 15, further comprising a rigid mechanical link extending between the housing and at least one of the pair of opposing plates.

17. The low vibration cryostat recited in claim 15 where the one or more springs extend at least partially between one of the pair of opposing plates and the housing.

18. The low vibration cryostat recited in claim 17, further comprising an adjustable support coupled to the housing and each spring, each adjustable support including an adjustable end portion moveable relative to the housing for adjusting a position of the cold head relative to the corresponding one of the pair of opposing plates.

\* \* \* \* \*